US011946595B2

(12) United States Patent
Money et al.

(10) Patent No.: US 11,946,595 B2
(45) Date of Patent: Apr. 2, 2024

(54) ENCLOSURE FOR THE FILL PLUG OF A BEVERAGE CARBONATION SYSTEM OR THE LIKE

(71) Applicant: Dixon Valve & Coupling Company, LLC, Chestertown, MD (US)

(72) Inventors: Josh Money, Kings Mountain, NC (US); Mike Suggs, Statesville, NC (US); Jesse Nelson, Concord, NC (US)

(73) Assignee: DIXON VALVE & COUPLING COMPANY, LLC, Chestertown, MD (US)

( * ) Notice: Subject to any disclaimer, the term of this patent is extended or adjusted under 35 U.S.C. 154(b) by 518 days.

(21) Appl. No.: 17/108,289

(22) Filed: Dec. 1, 2020

(65) Prior Publication Data
US 2021/0178344 A1  Jun. 17, 2021

Related U.S. Application Data

(60) Provisional application No. 62/948,537, filed on Dec. 16, 2019.

(51) Int. Cl.
| | |
|---|---|
| *F17C 5/02* | (2006.01) |
| *F16K 27/12* | (2006.01) |
| *F17C 13/06* | (2006.01) |

(52) U.S. Cl.
CPC .............. *F17C 13/06* (2013.01); *F16K 27/12* (2013.01); *F17C 5/02* (2013.01);
(Continued)

(58) Field of Classification Search
CPC .... B65D 43/16; B65D 43/163; B65D 43/164; B65D 45/16; B65D 45/22; F17C 5/02; F17C 13/06; F17C 2205/03; F17C 2205/0308; F17C 2205/037; F17C 2205/0311; F17C 2209/234;
(Continued)

(56) References Cited

U.S. PATENT DOCUMENTS

| | | | |
|---|---|---|---|
| 2,080,728 A * | 5/1937 | MacNeill | F17C 13/06 220/727 |
| 3,185,336 A | 5/1965 | Goss | |

(Continued)

OTHER PUBLICATIONS

Chart Bulk CO2 Systems, "Technical Service Bulletin—New Design Fill Box/Assemblies and Updated Vent Line Connections", TSB-BEV-1009, Apr. 2017.

*Primary Examiner* — Kevin F Murphy
*Assistant Examiner* — Jonathan J Waddy
(74) *Attorney, Agent, or Firm* — Howson & Howson LLP

(57) ABSTRACT

An enclosure for a fill plug is provided and includes a base to which a retainment plate is secured. The retainment plate has an opening for engaging about a throat of the fill plug such that axial and rotational movement of the fill plug relative to the base is prevented. A lid is secured to the base and is movable between a closed position in which the lid covers the base and an open position in which the base is uncovered by the lid. The lid defines a cavity for accommodating the fill plug when the lid is in the closed position. A lock is carried by the lid for locking the lid in the closed position, a spring resiliently urges the lid into the open position when the lid is unlocked, and a gasket is carried by the lid for forming a seal with the base.

13 Claims, 5 Drawing Sheets

(52) U.S. Cl.
 CPC . *F17C 2205/0311* (2013.01); *F17C 2205/037* (2013.01); *F17C 2221/013* (2013.01)

(58) Field of Classification Search
 CPC .......... F17C 2221/013; F17C 2270/059; F16K 27/12; F16L 35/00; F16L 35/05; F16L 55/1018; F16L 35/005; B01F 23/2362; B01F 23/2366; B01F 23/237621; B01F 2101/14
 USPC ........ 137/377, 381, 382; 220/263, 264, 324, 220/326, 810, 827, 830
 See application file for complete search history.

(56) References Cited

U.S. PATENT DOCUMENTS

| | | | | |
|---|---|---|---|---|
| 3,722,533 | A * | 3/1973 | Connolly | F16K 27/12 137/382 |
| 3,952,770 | A * | 4/1976 | Botnick | F16K 24/00 137/218 |
| 4,030,322 | A * | 6/1977 | Pettit | B60K 15/05 292/201 |
| 4,103,806 | A * | 8/1978 | White | B65D 83/40 222/3 |
| 4,254,888 | A | 3/1981 | Chandler | |
| 4,301,828 | A * | 11/1981 | Martin, Jr. | B60K 15/05 137/381 |
| 4,352,370 | A | 10/1982 | Childress | |
| 4,420,022 | A * | 12/1983 | Landry | F17C 5/02 285/330 |
| 5,158,105 | A * | 10/1992 | Conway | F16K 11/044 137/302 |
| 5,238,141 | A * | 8/1993 | Callegari | F17C 13/06 220/725 |
| 5,927,111 | A | 7/1999 | Nachbauer | |
| 5,964,246 | A * | 10/1999 | Meeker | E03C 1/042 137/382 |
| 6,119,718 | A | 9/2000 | Cappuccio | |
| 6,806,422 | B1 * | 10/2004 | Rivers | H02B 1/50 361/600 |
| 7,258,127 | B1 | 8/2007 | Schneider | |
| 7,395,834 | B1 * | 7/2008 | Lawson | E03C 1/021 137/359 |
| 7,478,646 | B2 | 1/2009 | Borrenpohl et al. | |
| 8,707,985 | B2 | 4/2014 | Goss | |
| 8,720,738 | B1 * | 5/2014 | Ryman | F17C 13/06 220/724 |
| 9,580,891 | B2 * | 2/2017 | Ball | E03B 9/10 |
| 9,666,988 | B2 | 5/2017 | Gates et al. | |
| 9,909,703 | B2 | 3/2018 | Van Scyoc | |
| 11,359,358 | B1 * | 6/2022 | Timms | E03B 9/025 |
| 2011/0062834 | A1 * | 3/2011 | Ball | A62C 35/20 312/215 |
| 2015/0000767 | A1 * | 1/2015 | Ball | E03B 9/10 137/382 |
| 2018/0282980 | A1 * | 10/2018 | Walcome | E03B 9/025 |

* cited by examiner

ENCLOSURE FOR THE FILL PLUG OF A BEVERAGE CARBONATION SYSTEM OR THE LIKE

CROSS REFERENCE TO RELATED APPLICATIONS

This application claims the benefit under 35 USC § 119(e) of U.S. Provisional Patent Application No. 62/948,537 filed Dec. 16, 2019.

BACKGROUND

This disclosure relates to securing and sealing fill plugs of $CO_2$ beverage carbonation systems or like systems requiring the bulk delivery and transfer of a fluid substance, such as a cryogenically controlled liquid or any other type of fluid product.

For purposes of example, the beverage industry uses carbon dioxide ($CO_2$) for carbonation, and for purposes of re-supplying carbon dioxide to a relatively large user of carbon dioxide, such as a restaurant, service center, or like facility, carbon dioxide is typically transported in a cryogenically controlled liquid form in a relatively large $CO_2$ supply tank carried on a delivery truck. The restaurant or like business will typically have a free-standing $CO_2$ tank located exterior of the building or may have a fill line permanently plumbed to an exterior wall of the building or like facility.

For purposes of beginning a fill process, a truck operator accesses a fitting or nipple of a fill plug, which may be located on a wall in a wall-mount arrangement (see FIG. 1) or on the top of a tank in a free-standing tank arrangement (see FIGS. 2 and 3), and connects a supply hose having a coupler to the fitting or nipple to thereby connect the supply tank to the fitting and enable bulk fluid delivery of carbon dioxide in liquid form to the consumer. Cryogenically controlled liquids, such as carbon dioxide, need to be handled with care upon transferring from the supply tank to the receiving facility due to the low temperature, high pressure, and like characteristics of the cryogenically controlled liquid being delivered. Following the fill process, the coupler is disconnected from the fitting or nipple.

For purposes of covering a wall-mounted fill plug when not in use during a delivery and fill process, a conventional sheet metal box may be provided. For instance, see the fill plug 10 and prior art sheet metal box 12 shown in FIG. 1. The sheet metal box 12 includes a sheet metal lid 14 connected thereto via a hinge 16. The lid 16 can be pivoted to a closed position that closes the box 12 and covers and prevents access to the fill plug 10. The lid 16 can also be pivoted to an open position in a downward direction, as shown in FIG. 1, permitting access to the fill plug, such as during a fill process.

FIGS. 2 and 3 show a typical free-standing tank 18 having a fill plug 20 on a top 22 of the tank 18. Such a fill plug is typically permitted to essentially remain exposed when not in use.

With the arrangements shown in FIGS. 1-3, contaminants, water, and the like are not necessarily prevented from contacting the fill plug during interim periods of time between fill processes. Also, unwanted access to the fill plug is typically capable with relatively little effort. Thus, adequate securing and sealing of the fill plug in wall-mount and free-standing applications are not necessarily provided.

SUMMARY

An enclosure for a fill plug is provided such that the enclosure can be used with a wall-mounted fill plug or a fill plug on a free-standing tank. The enclosure includes a base to which at least one retainment plate is secured. The retainment plate has an opening for engaging about a throat of the fill plug such that axial and rotational movement of the fill plug relative to the base is prevented. A lid is secured to the base via a hinge and is movable between a closed position in which the lid covers the base and an open position in which the base is uncovered by the lid. The lid defines a cavity for accommodating and covering the fill plug when the lid is in the closed position relative to the base. A lock is carried by the lid for locking the lid in the closed position, and a spring resiliently urges the lid into the open position when the lid is unlocked relative to the base. A gasket is carried by the lid for forming a seal between the lid and the base when the lid is in the closed position. The base can be used with or without a backplate.

DETAILED DESCRIPTION

Figure 1:
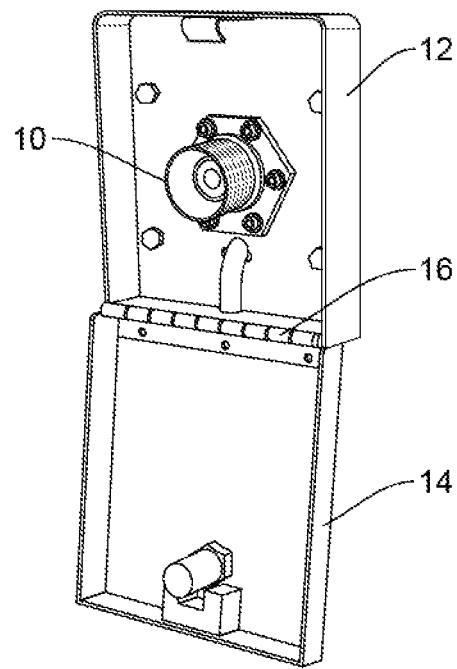
FIG. 1 is an image of a prior art wall-mounted fill plug and sheet metal box.
Figure 2:
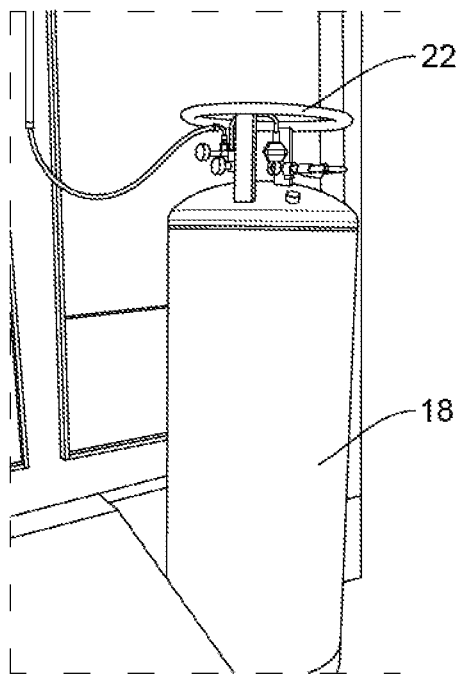
FIG. 2 is an image of a prior art free-standing tank.
Figure 3:
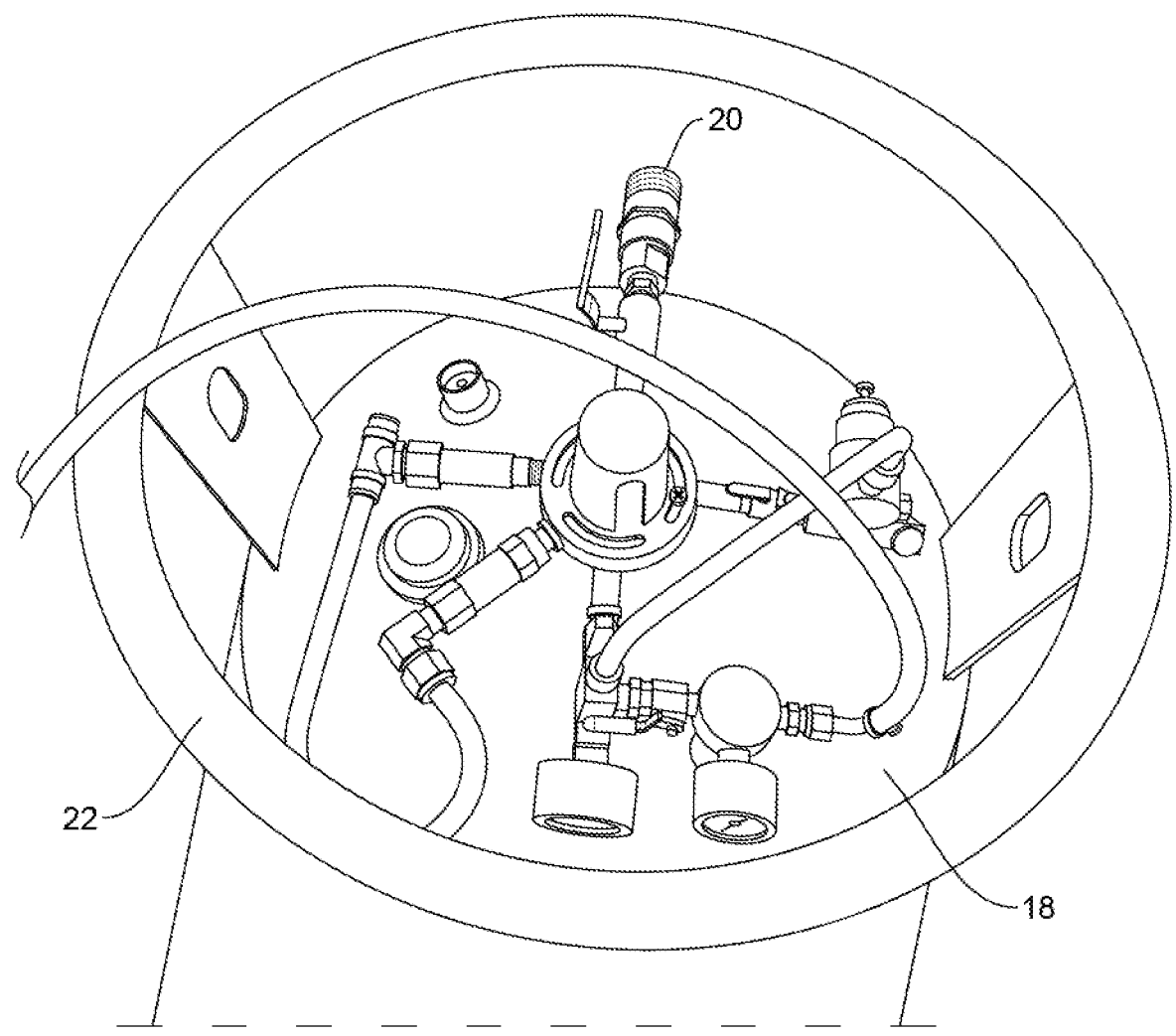
FIG. 3 is an image of the top of the tank of FIG. 2 having a fully exposed fill plug.

Embodiments disclosed herein are directed to securing and sealing a fill plug of a $CO_2$ beverage carbonation or like system between service/fill dates. Although the bulk delivery of $CO_2$ in the beverage industry may be referenced herein, it should be understood that embodiments disclosed herein can be utilized for securing and sealing a fill plug used for the bulk delivery, loading, unloading, or transfer of any cryogenically controlled liquid or any other fluid product delivered and transferred in any industry.

As referenced above, fill plugs may be located and attached directly to a tank, or remotely from a storage tank via a hose or like conduit. For a fill plug that is attached remotely, embodiments disclosed herein mount the fill plug to an enclosure 30 (described below in greater detail) which is then mounted on an exterior wall of a building. This is referred to as a "wall-mount" application. Alternatively, if the fill plug is attached directly to the tank, the enclosure 30 may be mounted directly onto the fill plug on the tank. This is referred to as a "free-standing" application.

The primary functions of the enclosure 30 are to prevent unauthorized access to the fill plug and to seal out contaminants, moisture, and other foreign material, particularly during periods of time between service dates in which use of the fill plug during a fill process is not required. The enclosure 30 may be compatible with various styles, types, and sizes of fill plugs typically used in the industry and may function to prevent contaminants and water from contacting the fill plug that may be used, for instance, in the transfer of beverage grade $CO_2$.

As will be discussed in greater detail with reference to FIGS. 3-6, the enclosure 30 has one or more retainment plates (such as anti-thrust and anti-rotation plates), 32 and 34, defining a collar for fitting about and securing to a throat of a fill plug. In addition, the enclosure 30 includes a hinged lid 36 that is able to house and protect the fill plug when the lid 36 is in a closed position relative to a base 38 of the enclosure 30. The lid 36 is able to be locked in the closed position with a key lock 40 or the like to prevent unauthorized access to the fill plug and includes an inner rim 42 with a seal or sealing gasket 44 that forms a seal with the base 38 to prevent contamination of the fill plug between service dates. The hinge 46 of the lid 36 includes a spring 48 that resiliently positions the lid 36 in an open position when the lid is unlocked from the base 38 so that it remains in an open position during a service operation.

In a free-standing application, the base 38 can be directly applied about the fill plug on the tank; alternatively, in a wall-mount application, the base 38 can be secured to a backplate 50 which can be secured to a wall of a building where the fill plug is mounted on the wall. The lid 36, base 38, and backplate 50 may be made, for instance, of a glass reinforced blend of polyphenylene and high impact polystyrene.

Figure 4:
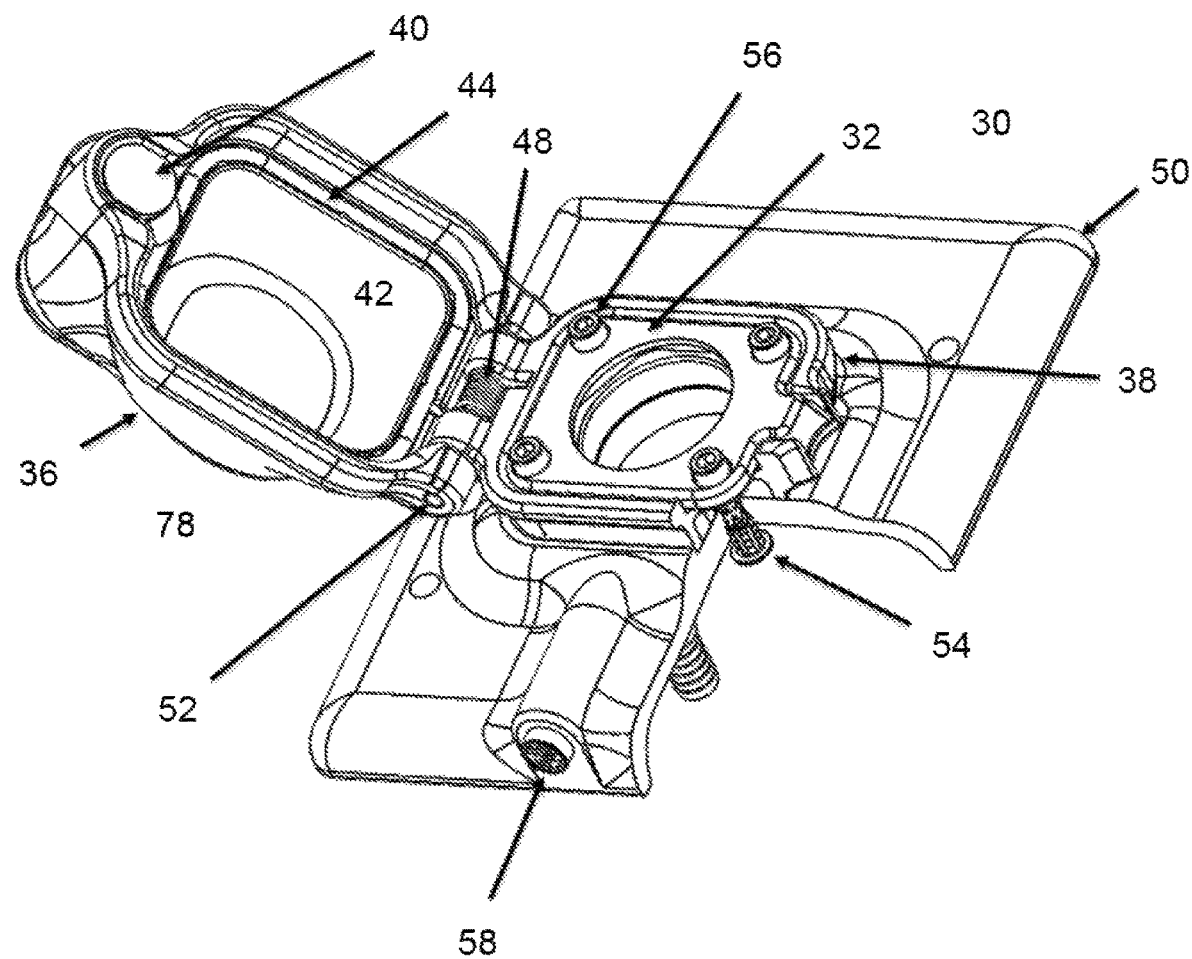
FIG. 4 is a partially cut-away perspective view of an enclosure for a wall-mount application in accordance to an embodiment.

Referring specifically to FIG. 4, the enclosure 30 includes lid 36, base 38, backplate 50, a hinge pin 52, lock 40, spring 48, seal or gasket 44, threaded inserts 54, bolts or like fasteners 56, a vent tube 58, and one or more retainment plates, 32 and 34. As stated above, the base 38, lid 36, and backplate 50 may be molded components, such as injection molded components or the like, that are made of plastic or a thermoplastic material such as a glass reinforced blend of polyphenylene and high impact polystyrene or any other similar material.

The retainment plate or plates, 32 and 34, may be made of metal or like material and may be secured to the base 38 with the bolts 58 and threaded inserts 54 or any other type of fasteners and provide a central opening 60 defining a collar for fitting about a throat of a fill plug 62 thereby securing and locking the fill plug 62 to the base 38. For instance, see FIG. 6. In addition, the retainment plate or plates, 32 and 34, may prevent rotational and axial movement of the fill plug 62 relative to the base 38 and may include an exposed edge or catch 64 that cooperates with the lock 40 carried on the lid 36 for use in locking the lid 36 in a closed position to the base 38. The lock 40 may be a key-operated lock or like locking mechanism which includes a latch 66 or like locking component that can be advanced underneath the catch 64 of the retainment plate 32 to lock the lid 36 in a closed position or retracted to a freed position relative to the catch 64 of the retainment plate 32 to permit the lid 36 to resiliently pivot to an open position via force of the spring 48.

The retainment plates, 32 and 34, may be replaceable or interchangeable and the selection thereof may depend on the series, type, or size of fill plug to which the enclosure 30 is to be secured. Thus, different retainment plates or sets of retainment plates may be provided and selected for use so that the proper retainment plate or plates may be utilized on any specific fill plug and will provide a proper fit. In addition, the retainment plates may include an anti-thrust plate 32 having an inner peripheral circular edge 68 defining the central opening 60 stacked on an anti-rotation plate 34 having an inner peripheral multi-sided edge 70 also defining the central opening 60 for providing a secure connection to the fill plug 62 in a manner preventing rotational and axial movement of the fill plug 62 relative to the base 38.

Figure 5:
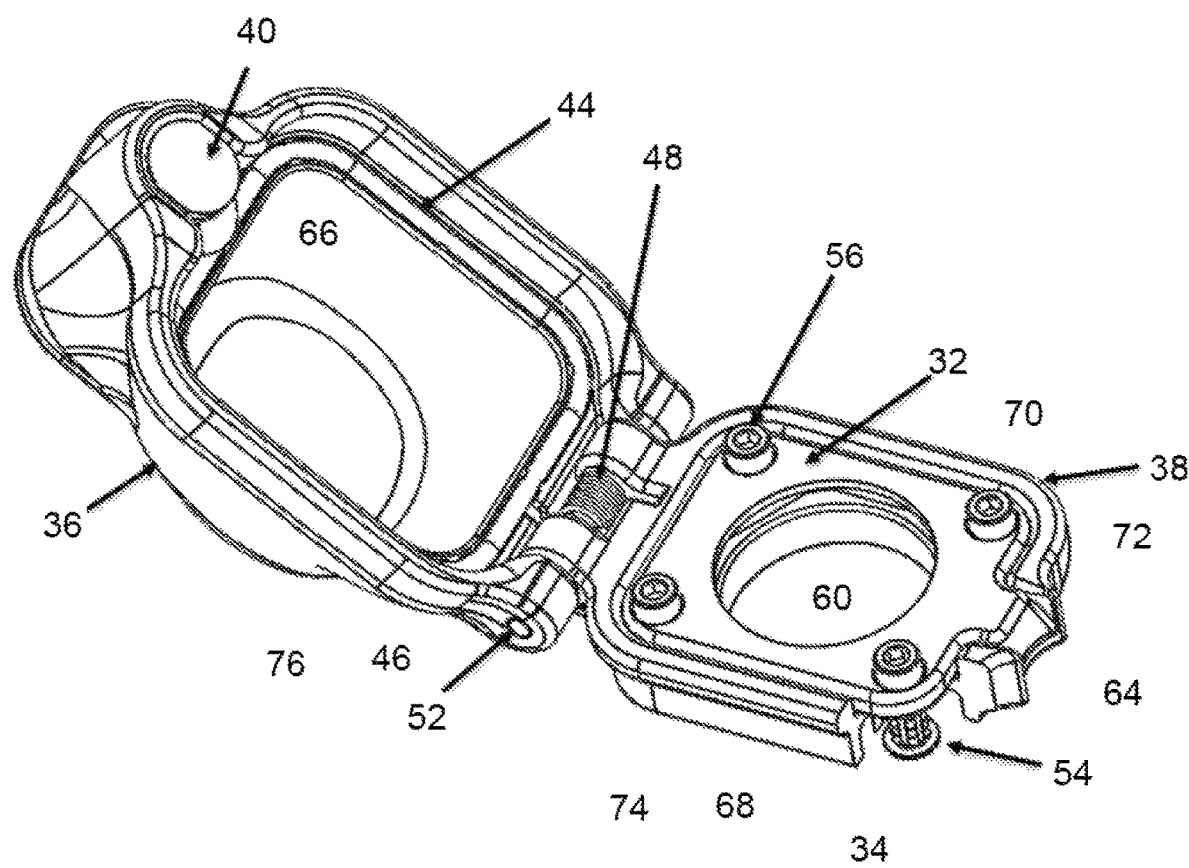
FIG. 5 is a partially cut-away perspective view of the enclosure of FIG. 4 in a condition for use in a free-standing application in accordance to an embodiment.
Figure 6:
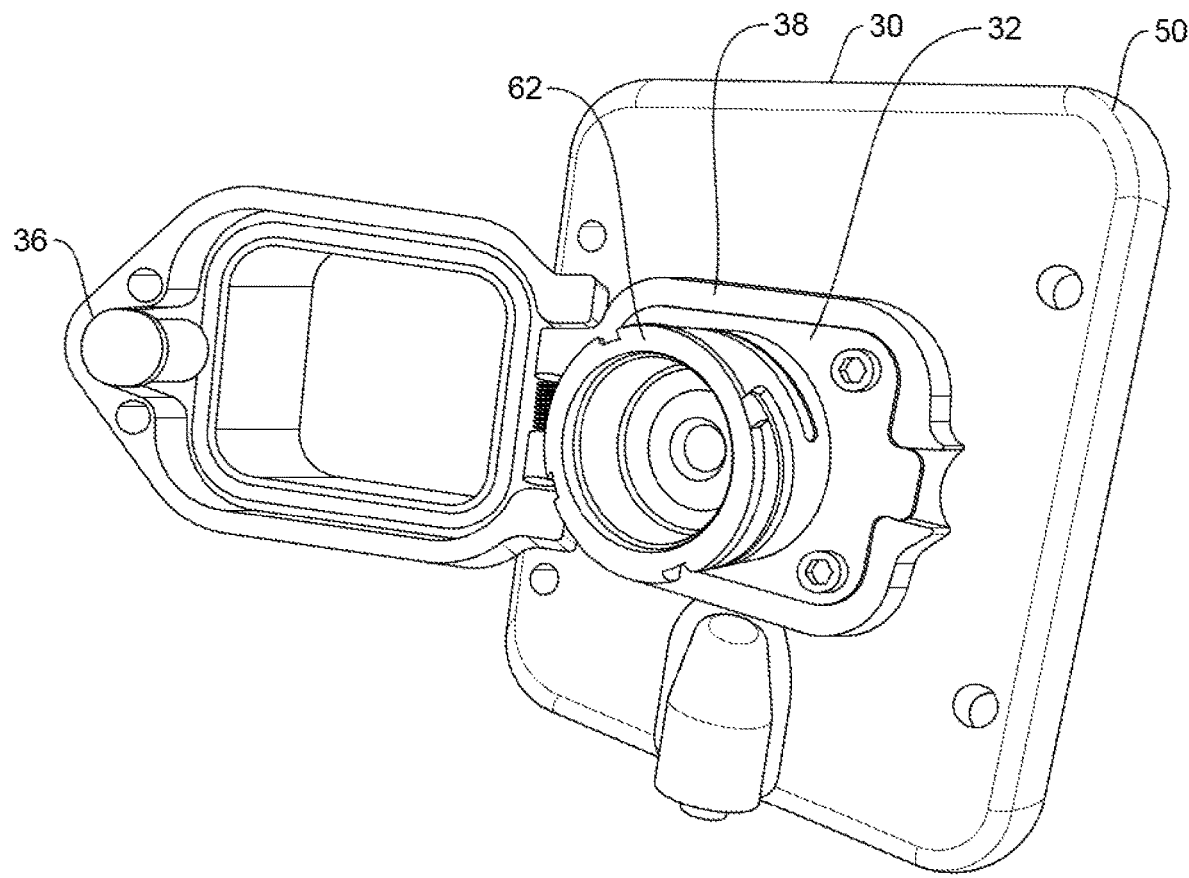
FIG. 6 is a perspective view of the enclosure of FIG. 4 connected to a fill plug in accordance to an embodiment.

The backplate 50 is attachable/removable to and from the base 38 so that the enclosure may be used for wall-mount applications (for instance, see FIGS. 4 and 6) in which the backplate 50 is connected to the base 38 and so that it may be removed from the base 38 and not used in free-standing applications (for instance, see FIG. 5). The same fasteners, 54 and 56, that secure the retainment plates, 32 and 34, to the base 38 may also be used to secure the backplate 50 to the base 38. The vent tube 58 may be formed or molded as an integral part of the backplate 50 (for instance, see FIG. 4). The vent tube 58 may be used to vent excess $CO_2$ from the system and/or to pressure test the system. The vent tube 58 is only used in wall-mount applications.

The base 38 provides a mount for the lid 36 via the hinge pin 52 and serves to mount the fill plug 62 via the retainment plates, 32 and 34, as discussed above. The base 38 also provides support for the retainment plates, 32 and 34, as discussed above. In wall-mount applications the base 38 is mounted to the backplate 50. See FIGS. 4 and 6. In free-standing applications, the base 38 can be mounted directly to a fill plug on the top of a free-standing top without use of the backplate 52. See FIG. 5.

The base 38 has an integrated peripheral relatively-flat lip 72 on an upper surface thereof that surrounds the retainment plates, 32 and 34, and that extends laterally outward from the retainment plates, 32 and 34, and laterally outward of the footprint of a sidewall 74 of the base 38. The lip 72 may be continuous, except for where the catch 64 of the anti-thrust retainment plate 32 extends.

The lid 36 serves to provide a protective cover for the fill plug 62 when the fill plug 62 is not being used, such as during periods of time between service/fill dates. The lid 36 pivots and is mounted to the base 38 via the hinge pin 46 or other hinging mechanism. The lid 36 defines a central cavity 76 for accommodating the fill plug 62 when the lid 36 is in a closed and locked condition relative to the base 38.

The gasket or seal 44 made of an elastomeric material or the like is carried by the lid 38 surrounding the bottom of the central cavity 76 so that, when the lid 36 is closed relative to the base 38, the gasket 44 creates a fluid-tight seal (under normal pressures) with the peripheral lip 72 on the upper surface of the base 38 surrounding the retainment plates, 32 and 34, and an upper surface of the catch 64. In addition, the lid 36 includes an outer peripheral skirt 78 surrounding and extending beyond the gasket 44. Accordingly, when the lid 36 is in a closed condition, the lid 36 fully overlaps and covers the base 38, including covering the peripheral lip 72 and sidewall 74 of the base 38 with the outer peripheral skirt 78 of the lid 36 contacting the backplate 50, when the backplate 50 is used in a wall-mount application. This arrangement of the lip 72 of the base 38 and the skirt 78 of the lid 36 prevents water or other moisture from even reaching the gasket or seal 44. Thus, the combination of this structure and seal prevents the fill plug 62 from being exposed to any contaminants or the like when the lid 36 is in the closed and locked condition.

According to an embodiment, the lid 36 may be designed to open in a sideways direction and may be mounted to open in either sideways direction. In addition, the lid 36 is spring-loaded so that it is held open during a filling service.

The hinge pin 52 may be pressed into the lid 36 and base 38 allowing the lid 36 to pivot relative to the base 38. The hinge pin 52 may also retain the spring 48, which may be a torsion spring. Thus, the spring 48 may be located concentrically about the hinge pin 52 and may resiliently hold the lid 36 in an open position (i.e., the position shown in FIGS. 4-6) while the fill plug 62 is being serviced and/or during a filling operation.

The lock 40 is permanently fixed to the lid 36. When the lid 36 is closed, the lock 40 latches to one of the retainment plates 32. The seal or gasket 44 is retained in the lid 36 and is compressed between the lid 36 and base 38 to seal any gap between the lid 36 and base 38 when the lid 36 is in the closed and locked position. According to an embodiment, the seal 44 is not necessarily designed to hold pressure; rather, it is designed solely for the purpose of preventing entry of contaminants between the lid 36 and base 38 between service dates.

The foregoing description and specific embodiments are merely illustrative of the principles thereof, and various modifications and additions may be made to the disclosed enclosure by those skilled in the art, without departing from the spirit and scope of this invention.

We claim:

1. An enclosure for a fill plug, comprising:
   a base to which at least one retainment plate is secured, said retainment plate having an opening for engaging about a throat of the fill plug such that axial and rotational movement of the fill plug relative to said base is prevented;
   a lid secured to said base via a hinge and being movable between a closed position in which said lid covers said base and an open position in which said base is uncovered by said lid, said lid defining a cavity for accommodating the fill plug when said lid is in said closed position relative to said base;
   a lock carried by said lid for locking said lid in said closed position;
   a spring for resiliently urging said lid to said open position when said lid is unlocked relative to said base;
   a gasket carried by said lid for forming a seal between said lid and said base when said lid is in said closed position; and
   a backplate to which said base is removably secured such that, when said backplate is secured to said base, said base is configured for being mounted on a wall and secured to a wall-mounted fill plug and, when said backplate is removed from said base, said base is configured for being connected to a fill plug on a free-standing tank;
   wherein, when said backplate is secured to said base, said backplate is entirely external of said cavity and forms no part of a wall that defines said cavity.

2. The enclosure according to claim 1, further comprising fasteners for securing said at least one retainment plate to said base and for securing said base to said backplate.

3. The enclosure according to claim 1, further comprising a vent tube extending through said backplate.

4. The enclosure according to claim 1, wherein said hinge includes a hinge pin, and wherein said spring is a torsion spring that extends concentrically about said hinge pin.

5. The enclosure according to claim 1, wherein said base, said lid, and said backplate are made of plastic.

6. The enclosure according to claim 5, wherein said at least one retainment plate is made of metal.

7. The enclosure according to claim 1, wherein said base, said lid, and said backplate are made of a glass reinforced blend of polyphenylene and high impact polystyrene.

8. The enclosure according to claim 1, further comprising a fill plug of a beverage carbonation system to which said at least one retainment plate is secured, wherein said fill plug is located on an exterior of a wall of a building.

9. An enclosure for a fill plug, comprising:
   a base to which at least one retainment plate is secured, said retainment plate having an opening for engaging about a throat of the fill plug such that axial and rotational movement of the fill plug relative to said base is prevented;
   a lid secured to said base via a hinge and being movable between a closed position in which said lid covers said base and an open position in which said base is uncovered by said lid, said lid defining a cavity for accommodating the fill plug when said lid is in said closed position relative to said base;
   a lock carried by said lid for locking said lid in said closed position;
   a spring for resiliently urging said lid to said open position when said lid is unlocked relative to said base; and
   a gasket carried by said lid for forming a seal between said lid and said base when said lid is in said closed position;
   wherein said at least one retainment plate comprises an anti-thrust plate and an anti-rotation plate; and
   wherein said anti-thrust plate has an opening defined by an inner peripheral circular edge for fitting about the throat of the fill plug and said anti-rotation plate has an opening defined by an inner peripheral multi-sided edge for fitting about the throat of the fill plug.

10. The enclosure according to claim 9, wherein said at least one retainment plate has a catch and wherein said lock has a latch for cooperating with said catch for locking said lid in said closed position.

11. An enclosure for a fill plug, comprising:
   a base to which at least one retainment plate is secured, said retainment plate having an opening for engaging about a throat of the fill plug such that axial and rotational movement of the fill plug relative to said base is prevented;
   a lid secured to said base via a hinge and being movable between a closed position in which said lid covers said base and an open position in which said base is uncovered by said lid, said lid defining a cavity for accommodating the fill plug when said lid is in said closed position relative to said base;
   a lock carried by said lid for locking said lid in said closed position;
   a spring for resiliently urging said lid to said open position when said lid is unlocked relative to said base; and
   a gasket carried by said lid for forming a seal between said lid and said base when said lid is in said closed position;
   wherein said base has an outer peripheral lip extending laterally outward of said at least one retainment plate;
   wherein said gasket is positioned on said lid to engage said lip when said lid is in the closed position on said base; and
   wherein said base has a sidewall extending beneath said lip and wherein said lip extends laterally outward of said sidewall.

12. The enclosure according to claim 11, wherein said lid has a skirt surrounding said gasket such that, when said lid is in said closed position, said skirt overlaps and covers said lip and sidewall of said base.

13. An enclosure and fill plug assembly, comprising a fill plug of a beverage carbonation system and an enclosure, said enclosure comprising:
   a base to which at least one retainment plate is secured, said retainment plate having an opening engaging about a throat of the fill plug such that said fill plug is secured to said at least one retainment plate and such that axial and rotational movement of the fill plug relative to said base is prevented;

a lid secured to said base via a hinge and being movable between a closed position in which said lid covers said base and an open position in which said base is uncovered by said lid, said lid defining a cavity for accommodating the fill plug when said lid is in said closed position relative to said base;

a lock carried by said lid for locking said lid in said closed position;

a spring for resiliently urging said lid to said open position when said lid is unlocked relative to said base; and a gasket carried by said lid for forming a seal between said lid and said base when said lid is in said closed position;

wherein the fill plug is located on a free-standing tank.

* * * * *